United States Patent
Ayyar et al.

(10) Patent No.: US 8,606,934 B2
(45) Date of Patent: Dec. 10, 2013

(54) METHOD, SYSTEM, AND APPARATUS FOR SYSTEM LEVEL INITIALIZATION BY CONVEYING CAPABILITIES AND IDENTIFIERS OF COMPONENTS

(75) Inventors: Mani Ayyar, Cupertino, CA (US); Srinivas Chennupaty, Portland, OR (US); Akhilesh Kumar, Sunnyvale, CA (US); Doddabaliapur Narasimha-Murthy Jayasimha, Sunnyvale, CA (US); Murugasamy Nachimuthu, Hillsboro, OR (US); Phanindra K. Mannava, Folsom, CA (US); Ioannis T. Schoinas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 12/348,723

(22) Filed: Jan. 5, 2009

(65) Prior Publication Data
US 2009/0265472 A1    Oct. 22, 2009

Related U.S. Application Data

(62) Division of application No. 11/011,801, filed on Dec. 13, 2004, now Pat. No. 7,738,484.

(51) Int. Cl.
*G06F 3/00* (2006.01)
*G06F 13/00* (2006.01)
*G06F 15/16* (2006.01)
*G06F 15/177* (2006.01)
*H04L 12/42* (2006.01)

(52) U.S. Cl.
USPC ............ 709/228; 370/453; 709/222; 710/29; 710/100

(58) Field of Classification Search
USPC ............ 709/228, 222; 370/453; 710/29, 100
See application file for complete search history.

(56) References Cited

U.S. PATENT DOCUMENTS 4,570,220 A * 2/1986 Tetrick et al. ................ 710/306
4,646,075 A   2/1987 Andrews et al.
(Continued)

FOREIGN PATENT DOCUMENTS

CN    1107266    8/1997
CN    1525353    9/2004
(Continued)

OTHER PUBLICATIONS

Final Office Action from U.S. Appl. No. 11/011,801 mailed May 5, 2009, 10 pgs.
(Continued)

*Primary Examiner* — Tonia L Dollinger
*Assistant Examiner* — Daniel C Murray
(74) *Attorney, Agent, or Firm* — Blakely, Sokoloff, Taylor & Zafman LLP

(57) ABSTRACT

Multiple initialization techniques for system and component in a point-to-point architecture are discussed. Consequently, the techniques allow for flexible system/socket layer parameters to be tailored to the needs of the platform, such as, desktop, mobile, small server, large server, etc., as well as the component types such as IA32/IPF processors, memory controllers, IO Hubs, etc. Furthermore, the techniques facilitate powering up with the correct set of POC values, hence, it avoids multiple warm resets and improves boot time. In one embodiment, registers to hold new values, such as, Configuration Values Driven during Reset (CVDR), and Configuration Values Captured during Reset (CVCR) may be eliminated.
For example, the POC values could be from the following: Platform Input Clock to Core Clock Ratio, Enable/disable LT, Configurable Restart, Burn In Initialization Mode, Disable Hyper Threading, System BSP Socket Indication, and Platform Topology Index.

14 Claims, 6 Drawing Sheets

(56) References Cited

U.S. PATENT DOCUMENTS

| | | | |
|---|---|---|---|
| 5,007,163 A * | 4/1991 | Pope et al. | 29/840 |
| 5,265,207 A * | 11/1993 | Zak et al. | 712/15 |
| 5,315,533 A | 5/1994 | Stich et al. | |
| 5,367,658 A | 11/1994 | Spear et al. | |
| 5,406,209 A * | 4/1995 | Johnson et al. | 324/750 |
| 5,422,914 A * | 6/1995 | Snyder | 375/354 |
| 5,560,027 A * | 9/1996 | Watson et al. | 712/12 |
| 5,598,348 A | 1/1997 | Rusu | |
| 5,694,617 A | 12/1997 | Webb et al. | |
| 5,784,599 A * | 7/1998 | Elkhoury | 713/501 |
| 5,815,299 A | 9/1998 | Bayart et al. | |
| 5,845,310 A * | 12/1998 | Brooks | 711/3 |
| 5,852,631 A * | 12/1998 | Scott | 375/222 |
| 6,081,868 A * | 6/2000 | Brooks | 711/3 |
| 6,119,255 A * | 9/2000 | Akram | 714/724 |
| 6,182,253 B1 * | 1/2001 | Lawrence et al. | 714/718 |
| 6,189,106 B1 | 2/2001 | Anderson | |
| 6,275,905 B1 * | 8/2001 | Keller et al. | 711/141 |
| 6,292,215 B1 | 9/2001 | Vincent | |
| 6,311,281 B1 * | 10/2001 | Pole et al. | 713/322 |
| 6,311,298 B1 * | 10/2001 | Norrie | 714/718 |
| 6,321,276 B1 * | 11/2001 | Forin | 710/3 |
| 6,330,586 B1 | 12/2001 | Yates et al. | |
| 6,550,020 B1 * | 4/2003 | Floyd et al. | 714/10 |
| 6,557,069 B1 | 4/2003 | Drehmel et al. | |
| 6,650,155 B1 | 11/2003 | Nguyen et al. | |
| 6,725,317 B1 | 4/2004 | Bouchier et al. | |
| 6,728,668 B1 | 4/2004 | Kitamorn et al. | |
| 6,917,999 B2 | 7/2005 | Kumar et al. | |
| 6,928,500 B1 * | 8/2005 | Ramanujan et al. | 710/107 |
| 6,938,179 B2 * | 8/2005 | Iyer et al. | 714/4.4 |
| 6,985,502 B2 | 1/2006 | Bunton | |
| 6,996,657 B1 * | 2/2006 | Chambers et al. | 710/310 |
| 7,000,101 B2 * | 2/2006 | Wu et al. | 713/1 |
| 7,010,607 B1 * | 3/2006 | Bunton | 709/228 |
| 7,020,142 B2 * | 3/2006 | Kodaira | 370/395.21 |
| 7,051,218 B1 * | 5/2006 | Gulick et al. | 713/310 |
| 7,065,688 B1 | 6/2006 | Moyes et al. | |
| 7,117,311 B1 | 10/2006 | Rankin et al. | |
| 7,117,501 B2 * | 10/2006 | Rosu et al. | 719/310 |
| 7,146,510 B1 | 12/2006 | Helms et al. | |
| 7,146,512 B2 * | 12/2006 | Rothman et al. | 713/310 |
| 7,174,467 B1 | 2/2007 | Helms et al. | |
| 7,219,220 B2 * | 5/2007 | Cherukuri et al. | 713/2 |
| 7,370,240 B2 | 5/2008 | Dawkins et al. | |
| 7,483,974 B2 * | 1/2009 | Goud et al. | 709/224 |
| 7,484,125 B2 | 1/2009 | Wei | |
| 7,493,438 B2 | 2/2009 | Kaushik | |
| 7,509,403 B1 | 3/2009 | Lee et al. | |
| 7,555,671 B2 | 6/2009 | Nachimuthu et al. | |
| 7,647,490 B2 | 1/2010 | Wei et al. | |
| 7,668,925 B1 * | 2/2010 | Liao et al. | 709/212 |
| 7,668,997 B2 * | 2/2010 | Ramanujan et al. | 710/240 |
| 7,673,090 B2 | 3/2010 | Kaushik et al. | |
| 7,721,341 B2 | 5/2010 | England | |
| 7,734,741 B2 * | 6/2010 | Ayyar et al. | 709/221 |
| 7,761,696 B1 * | 7/2010 | Bhattacharyya et al. | 712/229 |
| 7,822,900 B2 | 10/2010 | Kaushik et al. | |
| 7,953,902 B2 * | 5/2011 | Mannava et al. | 710/11 |
| 8,171,121 B2 | 5/2012 | Ayyar et al. | |
| 8,301,739 B1 * | 10/2012 | Krishnan et al. | 709/222 |
| 8,355,345 B2 * | 1/2013 | Eisenhauer et al. | 370/254 |
| 2001/0053694 A1 | 12/2001 | Igarashi et al. | |
| 2002/0059501 A1 | 5/2002 | McKinney et al. | |
| 2002/0095610 A1 * | 7/2002 | Nunomura | 713/322 |
| 2002/0138225 A1 | 9/2002 | Wong et al. | |
| 2003/0005200 A1 | 1/2003 | Kumar et al. | |
| 2003/0023771 A1 | 1/2003 | Erickson et al. | |
| 2003/0037224 A1 | 2/2003 | Oehler et al. | |
| 2003/0058872 A1 * | 3/2003 | Berggreen et al. | 370/401 |
| 2003/0065752 A1 | 4/2003 | Kaushik et al. | |
| 2003/0115513 A1 * | 6/2003 | Harriman et al. | 714/49 |
| 2003/0120913 A1 * | 6/2003 | Wu et al. | 713/100 |
| 2003/0163753 A1 * | 8/2003 | Lu et al. | 714/2 |
| 2003/0167367 A1 | 9/2003 | Kaushik et al. | |
| 2004/0047283 A1 * | 3/2004 | Bonwick et al. | 370/201 |
| 2004/0088418 A1 * | 5/2004 | Iyer et al. | 709/227 |
| 2004/0120302 A1 * | 6/2004 | Sebire et al. | 370/347 |
| 2004/0133756 A1 | 7/2004 | Shaw et al. | |
| 2004/0153888 A1 | 8/2004 | Kadoi | |
| 2004/0177245 A1 | 9/2004 | Murphy | |
| 2004/0193706 A1 * | 9/2004 | Willoughby et al. | 709/223 |
| 2004/0193916 A1 * | 9/2004 | Kamada et al. | 713/200 |
| 2004/0196865 A1 * | 10/2004 | Natarajan et al. | 370/465 |
| 2004/0215911 A1 * | 10/2004 | Ouren et al. | 711/170 |
| 2004/0236798 A1 | 11/2004 | Srinivasan et al. | |
| 2004/0260910 A1 | 12/2004 | Watt et al. | |
| 2004/0267894 A1 | 12/2004 | Zaharias | |
| 2005/0022059 A1 | 1/2005 | Wei | |
| 2005/0044219 A1 * | 2/2005 | Lewis et al. | 709/225 |
| 2005/0144216 A1 | 6/2005 | England | |
| 2005/0152361 A1 * | 7/2005 | Kim et al. | 370/389 |
| 2005/0235166 A1 | 10/2005 | England et al. | |
| 2005/0259696 A1 | 11/2005 | Steinman et al. | |
| 2005/0278574 A1 | 12/2005 | Kitamorn et al. | |
| 2006/0018280 A1 * | 1/2006 | Kumar et al. | 370/331 |
| 2006/0041696 A1 * | 2/2006 | Cherukuri et al. | 710/100 |
| 2006/0184480 A1 | 8/2006 | Ayyar et al. | |
| 2006/0209722 A1 * | 9/2006 | Takeo et al. | 370/254 |
| 2007/0088863 A1 * | 4/2007 | Mannava et al. | 710/22 |
| 2007/0094491 A1 * | 4/2007 | Teo et al. | 713/153 |
| 2008/0307082 A1 * | 12/2008 | Cai et al. | 709/223 |
| 2009/0064179 A1 * | 3/2009 | Mannava et al. | 719/313 |
| 2009/0100203 A1 | 4/2009 | Wei | |
| 2009/0106471 A1 | 4/2009 | Kaushik et al. | |
| 2010/0177972 A1 | 7/2010 | Donoho | |
| 2010/0188972 A1 * | 7/2010 | Knapp | 370/226 |
| 2010/0217949 A1 | 8/2010 | Schopp et al. | |
| 2011/0032933 A1 * | 2/2011 | Eisenhauer et al. | 370/389 |
| 2013/0117474 A1 * | 5/2013 | Ajanovic et al. | 710/29 |

FOREIGN PATENT DOCUMENTS

| | | |
|---|---|---|
| CN | 1529465 | 9/2004 |
| JP | 7182225 | 7/1995 |
| KR | 20040073099 | 8/2004 |
| WO | WO-02/056547 | 7/2002 |
| WO | WO-03054713 | 7/2003 |

OTHER PUBLICATIONS

Office Action from U.S. Appl. No. 11/011,300 mailed Jun. 18, 2009, 13 pgs.

Office Action for Chinese Patent Application No. 200510107388.6 mailed Jun. 19, 2009, 7 pgs.

Office Action from U.S. Appl. No. 11/011,801 mailed Aug. 3, 2009, 10 pgs.

First Office Action for Chinese Patent Application No. 200810090191.9 mailed Sep. 18, 2009, 6 pgs.

Final Office Action from U.S. Appl. No. 11/011,300 mailed Jan. 23, 2009, 11 pgs.

Office Action for Chinese Patent Application No. 200510107388.6 mailed Nov. 23, 2007, 16 pgs.

Office Action for U.S. Appl. No. 11/011,300 mailed Oct. 7, 2008, 11 pgs.

Office Action for Chinese Patent Application No. 200510119157.7 mailed Dec. 14, 2007, 49 pgs.

Office Action for Chinese Patent Application No. 200510119157.7 mailed May 30, 2008, 11 pgs.

Office Action for Chinese Patent Application No. 200510119157.7 mailed Jul. 13, 2007, 6 pgs.

Office Action for Chinese Patent Application No. 200710188727.7 mailed Oct. 16, 2009, 1 pg.

Office Action for Chinese Patent Application No. 200710188727.7 mailed May 6, 2010, 1 pgs.

Office Action for Chinese Patent Application No. 200710188725.8 mailed Jan. 22, 2010, 7 pgs.

Notice of Allowance for U.S. Appl. No. 11/011,300 mailed Jan. 25, 2010, 9 pgs.

Third Office Action for Chinese Patent Application No. 200710188726.2 mailed Apr. 3, 2011, 10 pgs.

(56) References Cited

OTHER PUBLICATIONS

Office Action for U.S. Appl. No. 12/236,222 mailed May 12, 2011, 18 pgs.
Final Office Action for U.S. Appl. No. 12/236,047 mailed May 10, 2011, 9 pgs.
Final Office Action from U.S. Appl. No. 12/235,968 mailed Feb. 16, 2011, 7 pgs.
Second Office Action for Chinese Patent Application No. 200810090191.9 mailed Jul. 4, 2011, 9 pgs.
Second Office Action for Chinese Patent Application No. 200710188725.8 mailed Oct. 12, 2010, 11 pgs.
Second Office Action for Chinese Patent Application No. 200710188726.2 mailed Nov. 9, 2010, 5 pgs.
First Office Action for Chinese Patent Application No. 200710188726.2 mailed Apr. 15, 2010, 4 pgs.
Office Action from U.S. Appl. No. 12/235,968 mailed Sep. 28, 2010, 12 pgs.
Notice of Allowance from U.S. Appl. No. 11/011,801 mailed Apr. 27, 2010, 4 pgs.
Office Action for U.S. Appl. No. 12/236,047 mailed Jan. 3, 2011, 21 pgs.
"PCI Express, the mainstream of new generation I/O technology", 1994-2006 *China Academic Journal Electronic Publishing House*, 4 pages.
"Third Office Action of Chinese Patent Application No. 200710188727.7", Mailed Jul. 13, 2011, 6 pages.
"First Office Action of Chinese Patent Application No. 200510119157.7", Mailed Dec. 14, 2007, 15 pages.
Office action from U.S. Appl. No. 12/235,968, Mailed Jun. 6, 2012, 7 pages.
"4th Office Action for Chinese Patent Application 200710188727.7", Mailed Apr. 23, 2012. 10 pages.
"Fifth Office Action for Chinese Patent Application 200710188726.2", Mailed May 9, 2012, 7 pages.
"First Office Action for Chinese Patent Application 200710188725.8", Mailed Mar. 10, 2010, 7 pages.
"First Office Action for Chinese Patent Application No. 200510119157.7,", Mailing Date Dec. 14, 2007, 15 pages.
"Fourth Office Action for Chinese Patent Application 200710188726.2", Mailed Dec. 16, 2011, 6 Pages.
"Notice of Allowance for U.S. Appl. No. 12/235,968", Mailing Date Aug. 2, 2012, pages., 7 Pages.

\* cited by examiner

| System Profile Type Value | Usage |
|---|---|
| 0 | No information |
| 1 | POC values for IA32 cores in UP configuration |
| 2 | POC values for IA32 cores in DP configuration |
| 3 | POC values for IA32 cores in Small MP configuration |
| 4 | POC values for IA32 cores in Large MP configuration |
| 8 | POC values for IA32 cores in Mobile configuration |
| 12 | POC values for Itanium (IPF) cores in UP configuration |
| 13 | POC values for Itanium (IPF) cores in UP configuration |
| 14 | POC values for Itanium (IPF) cores in UP configuration |
| 15 | POC values for Itanium (IPF) cores in UP configuration |
| 16 | POC values for Memory Agents |
| 20 | POC values for IO Agents |

FIG. 4

METHOD, SYSTEM, AND APPARATUS FOR SYSTEM LEVEL INITIALIZATION BY CONVEYING CAPABILITIES AND IDENTIFIERS OF COMPONENTS

RELATED APPLICATIONS

This application is a Divisional of U.S. patent application Ser. No. 11/011,801 which is related to U.S. patent application Ser. No. 11/011,300, with a different set of inventors, filed Dec. 13, 2004.

BACKGROUND OF THE INVENTION

1. Field of the Invention

The present invention relates to systems that support efficient utilization of conveying initialization values for link based systems.

2. Description of the Related Art

Current systems based on the Front Side Bus (FSB) do not permit hot plug of an individual bus component. Likewise, the current systems suffer from pin limitation due to conveying initialization values and also suffer from performing multiple warm resets due to initial POC values being incorrect.

BRIEF DESCRIPTION OF THE SEVERAL VIEWS OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

FIG. 4 illustrates a block diagram for POC values as utilized by an embodiment.

DETAILED DESCRIPTION OF THE INVENTION

A method, apparatus, and system for system level initialization for a high speed point to point network (pTp) is described in the following description, for purposes of explanation, numerous details are set forth in order to provide a thorough understanding of the present invention. However, it will be apparent to one skilled in the art that these specific details are not required in order to practice the present invention.

An area of current technological development relates to reliability, availability, and serviceability (RAS). As previously described, current systems are based on the Front Side Bus (FSB) do not permit hot plug of an individual bus component. Likewise, the current systems suffer from pin limitation due to conveying initialization values and also suffer from performing multiple warm resets due to initial POC values are incorrect.

In contrast, the claimed subject matter overcomes the pin limitation by conveying initialization values using the link layer control flits and simplifies the hardware. Likewise, it allows for flexible system/socket layer parameters to be tailored to the needs of the platform, such as, desktop, mobile, small server, large server, etc., as well as the component types such as IA32/IPF processors, memory controllers, IO Hubs, etc. The claimed subject matter also facilitates powering up with the correct set of POC values; hence, it avoids multiple warm resets and improves boot time. In one embodiment, registers to hold new values, such as, Configuration Values Driven during Reset (CVDR), and Configuration Values Captured during Reset (CVCR) may be eliminated.

In one embodiment, the POC values comprise the following: Platform Input Clock to Core Clock Ratio, Enable/disable LT, Configurable Restart, Burn In Initialization Mode, Disable Hyper Threading, System BSP Socket Indication, and Platform Topology Index.

In one embodiment, the pTp architecture is defined by Intel's Common System Interface (CSI) and supports a layered protocol scheme, which is discussed in further detail in the next paragraph. Figure one illustrates one example of a cache coherence protocol's abstract view of the underlying network. One example of a cache coherence protocol is described in pending application P18890 filed in 2004.

Figure 1:
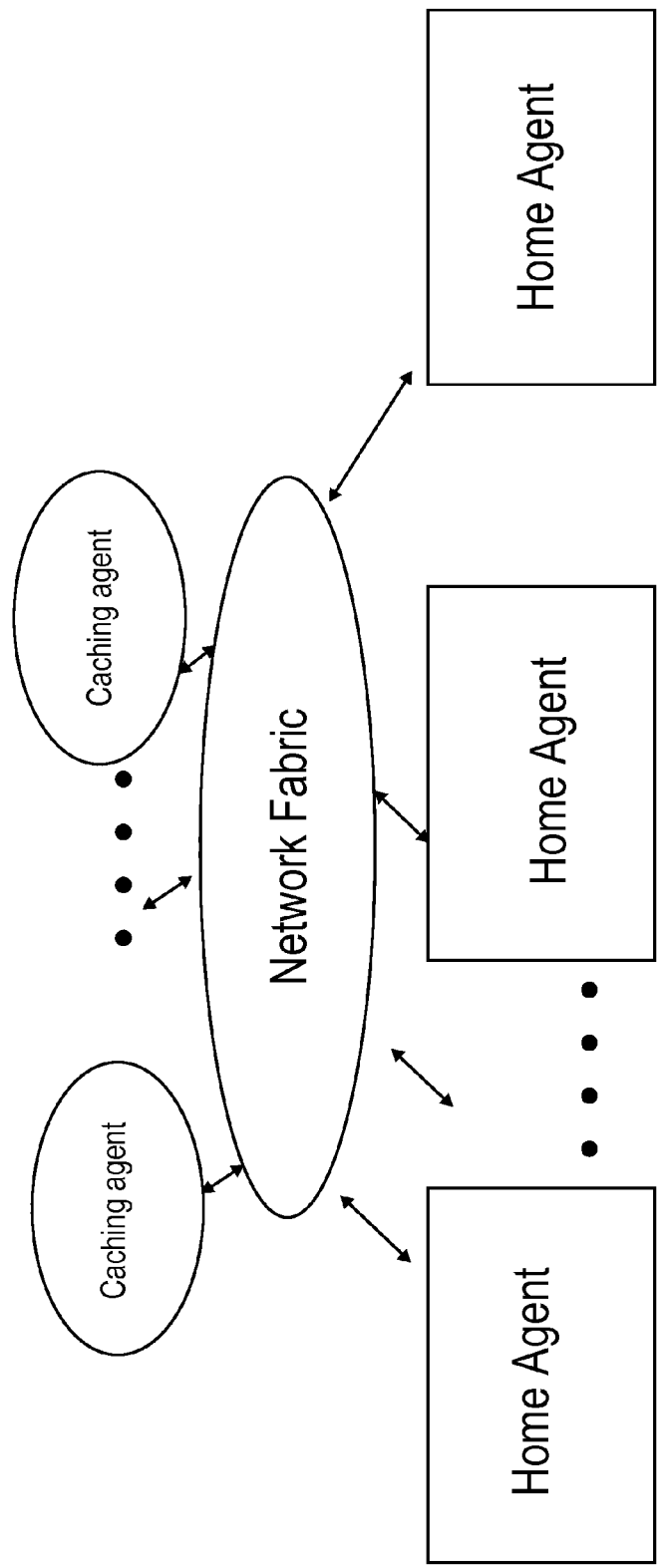
FIG. 1 is a protocol architecture as utilized by one embodiment.

FIG. 1 is a protocol architecture as utilized by one embodiment. The architecture depicts a plurality of caching agents and home agents coupled to a network fabric. For example, the network fabric adheres to a layered protocol scheme and may comprise either or all of: a link layer, a physical layer, a protocol layer, a routing layer, a transport layer. The fabric facilitates transporting messages from one protocol (home or caching agent) to another protocol for a point to point network. In one aspect, the figure depicts a cache coherence protocol's abstract view of the underlying network.

Figure 2:
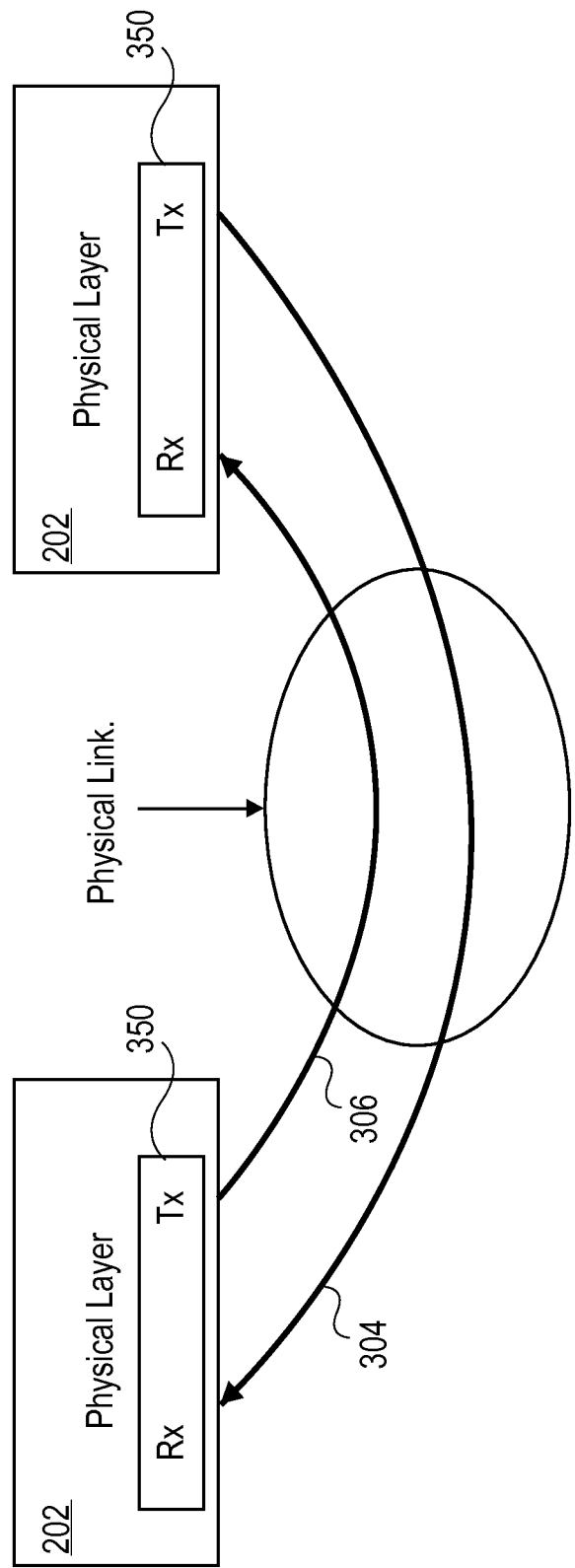
FIG. 2 is a block diagram of an apparatus for a physical interconnect utilized in accordance with the claimed subject matter.

FIG. 2 is a block diagram of an apparatus for a physical interconnect utilized in accordance with the claimed subject matter. In one aspect, the apparatus depicts a physical layer for a cache-coherent, link-based interconnect scheme for a processor, chipset, and/or IO bridge components. For example, the physical interconnect may be performed by each physical layer of an integrated device. Specifically, the physical layer provides communication between two ports over a physical interconnect comprising two uni-directional links. Specifically, one uni-directional link 304 from a first transmit port 350 of a first integrated device to a first receiver port 350 of a second integrated device. Likewise, a second uni-directional link 306 from a first transmit port 350 of the second integrated device to a first receiver port 350 of the first integrated device. However, the claimed subject matter is not limited to two uni-directional links. One skilled in the art appreciates the claimed subject matter supports any known signaling techniques, such as, bi-directional links, etc.

Figure 3:
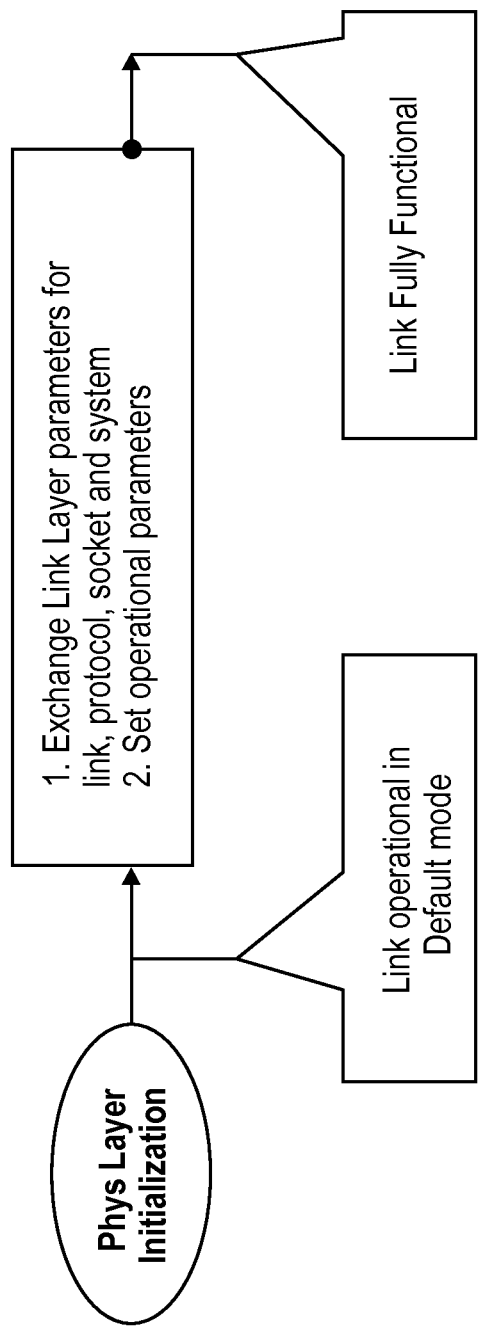
FIG. 3 illustrates a flow diagram for a method for Link layer initialization as utilized by an embodiment.

FIG. 3 illustrates a flow diagram for a method for Link layer initialization as utilized by an embodiment. To start the physical layer initialization, a signal is asserted, such as, a PWRGOOD signal. Subsequently, this permits electrical transfer of information between two neighbor components. Subsequently, the CSI link layer initialization is performed conveying the capabilities and identifiers of the components at either end of the link. Link layer initialization is achieved by the components exchanging link layer control messages (alternatively called control flits). The information conveyed using control flits includes parameters for the link layer, protocol layer as well as initialization values for the CSI component(s) on the socket and the system. Thus, the parameters pertaining to the link layer include values for flit framing, error detection and recovery policy, interleaving policy, virtual channel, flow control capability, etc. Parameters pertaining to the protocol layer include neighbor's Node identifiers, Agent type(s), Remote port#, profile dependent fields, etc. Parameters pertaining to socket/system layer include POC values, test and debug parameters, system configuration and initialization parameters, etc. In one embodiment, some of the exchanged parameters may be usable by more than one logic layer. Some of the parameters may be used by firmware in later stages of system initialization.

As previously discussed, control flits facilitate component and system initialization. Control flits associated with link initialization are followed by one or more control flits that are used for initialization of the CSI component(s) or the system. This exchange need not occur on all the links. The expected flow is from IO agent to CPU but CPU to IO agent flow is also possible, e.g., South Bridge Presence Indicator on CPU socket for use by the IO agent. This invention discusses initialization of the CSI socket/system parameters that are useful for:

processor firmware (Processor Abstraction Layer (PAL) or microcode) and system firmware (System Abstraction Layer (SAL) or Basic Input Output System (BIOS)).

The following examples of exchanged parameters comprise:
  i) SBSP indicator, Built in self test (BIST), Processor to Platform Clock Ratio, Authentication of external Firmware, Burn in Testing, parameters that aid in system test and debug, etc., conveyed typically on FSB based systems using pin hardware.
  ii) Indication of the cores that should remain inactive for avoiding defective cores or implementing licensing restrictions, Capacity on Demand feature, etc.
  iii) Platform Topology index, that may be used by the firmware to obtain values for programming the Route tables and other interconnect fabric using data from the firmware, non-volatile memory (NVM) or other platform resource.
  iv) Indication to a Memory controller to preserve the memory contents.
  v) Indication to an IO agent that the processor socket incorporates bridges, hubs and devices which are logically downstream from the IO agent.

FIG. 4 illustrates a block diagram for POC values as utilized by an embodiment. FIG. 4 depicts one example of defining POC values based on a value of a system profile type value.

In prior art systems, components start with one set of values due to the paucity of pins, firmware reads appropriate values from a platform resource, re-programs with desired values and then performs a warm reset to activate the new set of values.

In contrast, as previously discussed, the claimed subject matter facilitates utilizing the correct POC values to minimize warm resets. In one embodiment, the POC values are be derived in an implementation dependent manner. One possible mechanism is for the IO agent to derive values from straps and then pass them to processors. It may also be possible for the IO agent to obtain values from its local NVM or Firmware space, or obtain values from downstream chipsets using a separate protocol that occurs prior to the CSI link initialization.

In one embodiment, the POC values comprise the following: Platform Input Clock to Core Clock Ratio, Enable/disable LT, Configurable Restart, Burn In Initialization Mode, Disable Hyper Threading, System BSP Socket Indication, and Platform Topology Index.

Figure 5:
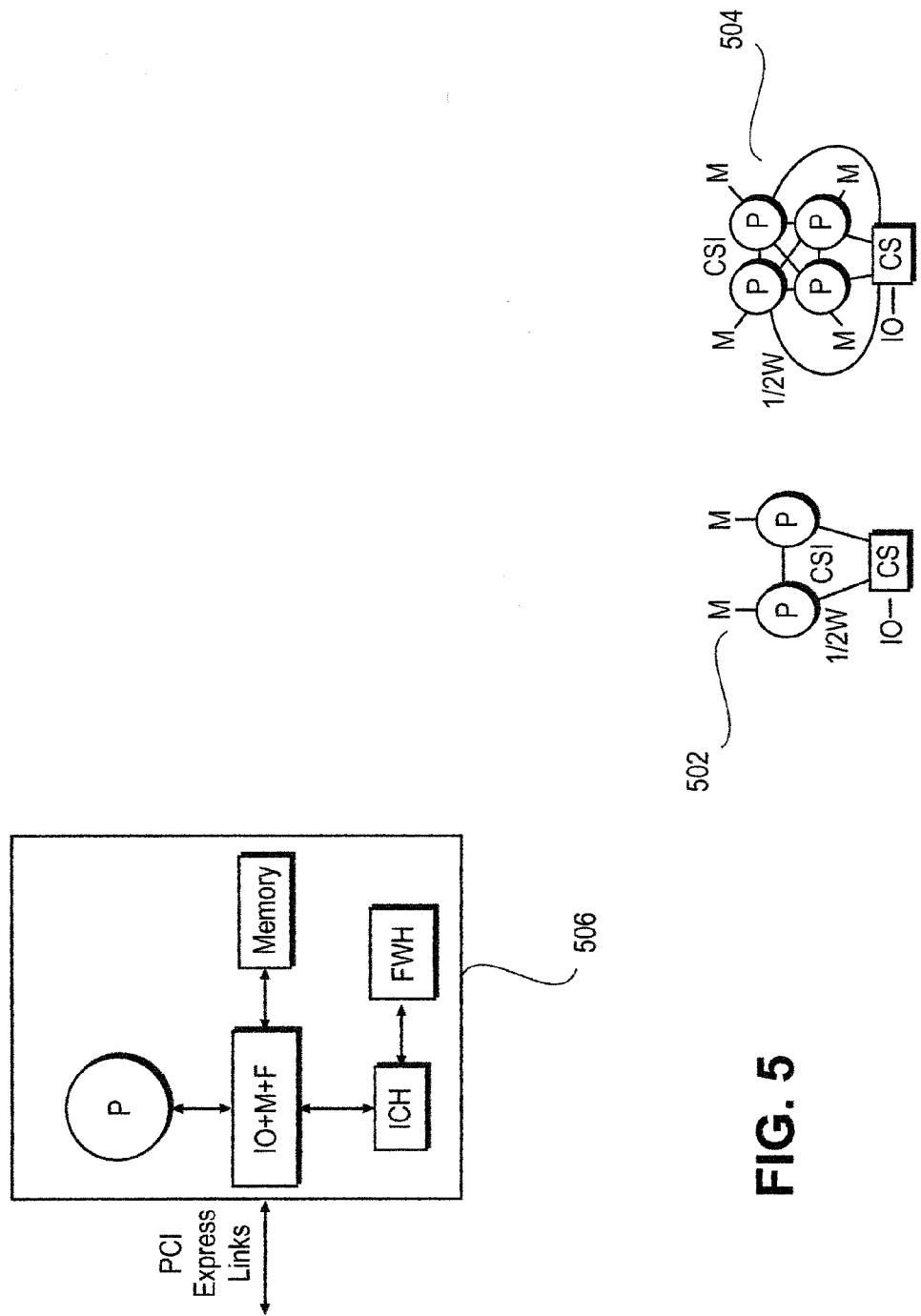
FIG. 5 is multiple embodiments of a system as utilized by multiple embodiments.

FIG. 5 depicts a point-to-point system with one or more processors. The claimed subject matter comprises several embodiments, one with one processor 506, one with two processors (P) 502 and one with four processors (P) 504. In embodiments 502 and 504, each processor is coupled to a memory (M) and is connected to each processor via a network fabric may comprise either or all of: a link layer, a protocol layer, a routing layer, a transport layer, and a physical layer. The fabric facilitates transporting messages from one protocol (home or caching agent) to another protocol for a point-to-point network. As previously described, the system of a network fabric supports any of the embodiments depicted in connection with FIGS. 1-4.

For embodiment 506, the uni-processor P is coupled to graphics and memory control, depicted as IO+M+F, via a network fabric link that corresponds to a layered protocol scheme. The graphics and memory control is coupled to memory and is capable of receiving and transmitting via PCI Express Links. Likewise, the graphics and memory control is coupled to the ICH. Furthermore, the ICH is coupled to a firmware hub (FWH) via a LPC bus. Also, for a different uni-processor embodiment, the processor would have external network fabric links. The processor may have multiple cores with split or shared caches with each core coupled to a Xbar router and a non-routing global links interface. Thus, the external network fabric links are coupled to the Xbar router and a non-routing global links interface.

Figure 6:
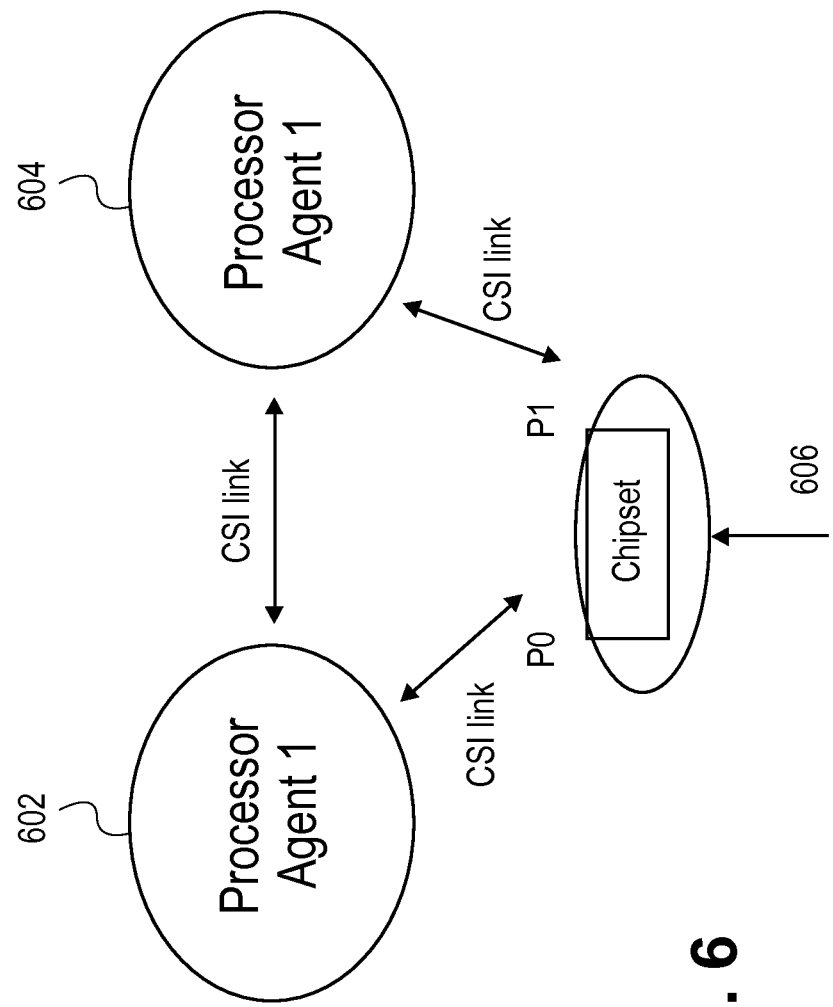
FIG. 6 illustrates a block diagram for node id assignment as utilized by an embodiment.

FIG. 6 illustrates a block diagram for node id assignment as utilized by an embodiment. In one embodiment, unique NodeIDs are needed for communication between CSI agents in a system. There are several embodiments that are used for derivation of unique NodeIDs in a CSI based system, such as:
  i) A uni-processor system configuration may use default NodeID values for the chipset and the processor component.
  ii) The platform may provide hardware straps for NodeID values that are read by the CSI component hardware and then used to initialize internal registers representing the NodeID. If a CSI component has multiple agents such as Processor, Memory, Configuration agent, it may suffix some bits to the hardware strap values and instantiate required unique NodeID values.
  iii) A Service processor may set the components' registers with unique NodeID values using server management channels such as JTAG or SMBUS.
  iv) A chipset may assign NodeIDs to processor agents using the link layer parameter exchange protocol, as shown in FIG. 6. All the links complete their physical layer initialization and send the ReadyForInit link layer control flit to their neighbors. The CSI processor agents, 602 and 604, then keep sending Null Control flits to each other and to the chipset 606 over their respective CSI link. The chipset, which is responsible for NodeID assignment to the processor agents, sends the Parameter Exchange Parameter 0 control flit that specifies the chipset's NodeID and the link port number on the chipset through which it is connected to the processor agent. The processors use the supplied port number as their own NodeID. For example, if the chipset has two ports numbered 0 and 1, one of the processor agents will derive a NodeID of 0 and the other a NodeID of 1. The chipset may also default to a NodeID value outside this range, e.g., 8. Once processors derive their NodeIDs, they can proceed further in the link initialization. They can respond to the chipset with their derived NodeIDs and also continue initialization of the processor-to-processor links. The system configuration shown in FIG. 2 can be implemented without any for hardware straps for specifying NodeID values.

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

The invention claimed is:

1. A method comprising:
   asserting a signal to subsequently permit electrical transfer of information, via control flits, between a first agent and a second agent of a link;
   performing initialization of a physical link layer by conveying capabilities and identifiers of components at the first and second agents, wherein the link layer initialization is further performed by exchanging link layer control messages including the control flits; and
   transmitting one or more of the control flits to initialize a component that adheres to a point-to-point (pTp) architecture, wherein each point to point link comprises a pair of uni-directional links between pairs of processing cores, and wherein the control flits support flexible system and socket layer parameters corresponding to a host platform and component types, and the control flits to provide initialization values, wherein the initialization values are used for powering up to avoid multiple warm resets and improve boot time, and eliminating pin limitation associated with computer hardware by conveying the initialization values via the control flits, wherein the information conveyed via the control flits during initialization of the physical layer includes the initialization values including one more of parameters for the link layer, parameters of a protocol layer, and initialization values of the components, wherein the control flits comprise one or more of:
   i) system boot strap processor (SBSP) indicator, built in self-test (BIST), Processor to Platform Clock Ratio, Authentication of external Firmware, Burn in Testing,
   ii) indication of cores that should remain inactive for avoiding defective cores or implementing licensing restrictions and Capacity on Demand feature,
   iii) platform topology index, that may be used by the firmware to obtain values for programming the route tables and other interconnect fabric using data from the firmware, non-volatile memory (NVM) or other platform resource,
   iv) indication to a memory controller to preserve the memory contents, and
   v) indication to an input/output (IO) agent that the processor socket incorporates bridges, hubs and devices that are logically downstream from the IO agent.

2. The method of claim 1, wherein the parameters of the link layer comprise one or more of:
   values for flit framing, error detection and recovery policy, interleaving policy, virtual channel, and flow control capability.

3. The method of claim 1, further comprising generating the initialization values via an implementation dependent manner, wherein the implementation dependent manner includes having the IO agent to obtain the initialization values from straps and then pass them on to processors.

4. The method of claim 3, wherein the initialization values comprise at least one of platform input clock to core clock ratio, configuration restart, burn in initialization mode, disable hyper threading, SBSP socket indication, and platform topology index.

5. A system that adheres to a point-to-point (pTp) architecture and facilitates initialization comprising:
   a plurality of processing devices and memory devices coupled to a network fabric a physical layer to assert a signal to subsequently to permit electrical transfer of information, via control flits, between a first agent and a second agent of a link of either the plurality of processing devices and memory devices, coupled to the network fabric;
   a physical link layer, wherein the physical link layers is initialized by conveying capabilities and identifiers of components at the first and second agents, wherein the link layer initialization is further performed by exchanging link layer control messages including the control flits; and
   the physical layer to transmit one or more of the control flits to initialize a component that adheres to the pTp architecture, wherein each point to point link comprises a pair of uni-directional links between pairs of processing cores, and wherein the control flits support flexible system and socket layer parameters corresponding to a host platform and component types, and the control flits to provide initialization values, wherein the initialization values are used for powering up to avoid multiple warm resets and improve boot time, and eliminating pin limitation associated with computer hardware by conveying the initialization values via the control flits, wherein the information conveyed via the control flits during initialization of the physical layer includes the initialization values including one more of parameters for the link layer, parameters of a protocol layer, and initialization values of the components, wherein the control flits comprise one or more of:
   i) system boot strap processor (SBSP) indicator, built in self-test (BIST), Processor to Platform Clock Ratio, Authentication of external Firmware, Burn in Testing,
   ii) indication of cores that should remain inactive for avoiding defective cores or implementing licensing restrictions and Capacity on Demand feature,
   iii) platform topology index, that may be used by the firmware to obtain values for programming the route tables and other interconnect fabric using data from the firmware, non-volatile memory (NVM) or other platform resource,
   iv) indication to a memory controller to preserve the memory contents, and
   v) indication to an input/output (IO) agent that the processor socket incorporates bridges, hubs and devices that are logically downstream from the IO agent.

6. The system of claim 5, wherein the pTp architecture adheres to a layered protocol scheme.

7. The system of claim 5, wherein the parameters of the link layer comprise one or more of:
   values for flit framing, error detection and recovery policy, interleaving policy, virtual channel, and flow control capability.

8. The system of claim 5, further comprising the initialization values that are generated via an implementation dependent manner, wherein the implementation dependent manner includes having the IO agent to obtain the initialization values from straps and then pass them on to processors.

9. The system of claim 8, wherein the initialization values comprise at least one of platform input clock to core clock ratio, configuration restart, burn in initialization mode, disable hyper threading, SBSP socket indication, and platform topology index.

10. An apparatus comprising:
a plurality of processing devices and memory devices coupled to a network fabric a physical layer to assert a signal to subsequently permit electrical transfer of information, via control flits, between a first agent and a second agent of a link of either the plurality of processing devices and memory devices, coupled to the network fabric;
a physical link layer, wherein the physical link layers is initialized by conveying capabilities and identifiers of components at the first and second agents, wherein the link layer initialization is further performed by exchanging link layer control messages including the control flits; and
the physical layer to transmit one or more of the control flits to initialize a component that adheres to a point-to-point (pTp) architecture, wherein each point to point link comprises a pair of uni-directional links between pairs of processing cores, and wherein the control flits support flexible system and socket layer parameters corresponding to a host platform and component types, and the control flits to provide initialization values, wherein the initialization values are used for powering up to avoid multiple warm resets and improve boot time, and eliminating pin limitation associated with computer hardware by conveying the initialization values via the control flits, wherein the information conveyed via the control flits during initialization of the physical layer includes the initialization values including one more of parameters for the link layer, parameters of a protocol layer, and initialization values of the components, wherein the control flits comprise one or more of:

i) system boot strap processor (SBSP) indicator, built in self-test (BIST), Processor to Platform Clock Ratio, Authentication of external Firmware, Burn in Testing,
ii) indication of cores that should remain inactive for avoiding defective cores or implementing licensing restrictions and Capacity on Demand feature,
iii) platform topology index, that may be used by the firmware to obtain values for programming the route tables and other interconnect fabric using data from the firmware, non-volatile memory (NVM) or other platform resource,
iv) indication to a memory controller to preserve the memory contents, and
v) indication to an input/output (IO) agent that the processor socket incorporates bridges, hubs and devices that are logically downstream from the IO agent.

11. The apparatus of claim 10, wherein the pTp architecture adheres to a layered protocol scheme.

12. The apparatus of claim 10, wherein the parameters of the link layer comprise one or more of:
values for flit framing, error detection and recovery policy, interleaving policy, virtual channel, and flow control capability.

13. The apparatus of claim 10, further comprising the initialization values that are generated via an implementation dependent manner, wherein the implementation dependent manner includes having the IO agent to obtain the initialization values from straps and then pass them on to processors.

14. The apparatus of claim 13, wherein the initialization values comprise at least one of platform input clock to core clock ratio, configuration restart, burn in initialization mode, disable hyper threading, SBSP socket indication, and platform topology index.

* * * * *